(12) United States Patent
Martin et al.

(10) Patent No.: US 7,594,005 B2
(45) Date of Patent: Sep. 22, 2009

(54) SYSTEM AND METHOD FOR INTERFACING DEVICES UNDER SNMP

(75) Inventors: Andrew Louis Martin, Ferny Creek (AU); Bruce Melrose Paterson, Ashwood (AU)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1029 days.

(21) Appl. No.: 10/362,493

(22) PCT Filed: Aug. 16, 2001

(86) PCT No.: PCT/AU01/01016

§ 371 (c)(1),
(2), (4) Date: Jul. 16, 2003

(87) PCT Pub. No.: WO02/17094

PCT Pub. Date: Feb. 28, 2002

(65) Prior Publication Data

US 2004/0010323 A1    Jan. 15, 2004

(51) Int. Cl.
*G06F 15/173*    (2006.01)

(52) U.S. Cl. .............. 709/223; 709/224; 709/245; 709/249; 709/250; 370/392; 370/401

(58) Field of Classification Search ............... 709/223, 709/224
See application file for complete search history.

(56) References Cited

U.S. PATENT DOCUMENTS

| 5,907,696 | A | 5/1999 | Stilwell et al. |
| 6,072,803 | A | 6/2000 | Allmond et al. |
| 6,115,385 | A | 9/2000 | Vig |
| 6,981,036 | B1 * | 12/2005 | Hamada .............. 709/223 |
| 7,024,476 | B1 * | 4/2006 | Page et al. .......... 709/224 |

* cited by examiner

*Primary Examiner*—Yves Dalencourt

(57) ABSTRACT

Means for masquerading IP addresses for non-IP devices are disclosed, enabling non-IP devices or sub-networks having incompatible address spaces to be connected to an IP network and appear as addressable network objects. In one embodiment, the means may be a remote system controller (RSC) that has a block of IP addresses assigned to it for use with connected sub-networks or devices. Normally each assigned address will be associated with a management information base (MIB) containing data about the associated device, and each MIB will be associated with a protocol converter and I/O port connectable to the respective device or sub-network.

10 Claims, 2 Drawing Sheets

SYSTEM AND METHOD FOR INTERFACING DEVICES UNDER SNMP

TECHNICAL FIELD

This invention relates to methods and apparatus for use in connecting devices and/or network elements to a TCP/IP network so that standard SNMP network management protocols can be employed to effect the monitoring and/or management of non-standard devices or elements, or of devices and/or elements that have conflicting IP addresses.

In this specification, a device can be any hardware item, or software/firmware applet that functions as such a device, that is connected to a network. A device can be simple, such as single pole mechanical switch, a temperature sensor or an alarm state; or it may be complex and be composed of many individual devices, such as a multiplexer, a PABX, a computer installation, a standby diesel engine or an entire generating station. While a communications network, or an element thereof can also be regarded as a device, it may also be a sub-network of devices managed using RMON, a subset of SNMP protocols relating to remote monitoring. In SNMP parlance, such devices and elements are often referred to as 'network objects' or, more simply, as 'objects'. As used herein, 'object' indicates a device on which IP is implemented so that it can be individually addressed, monitored and/or controlled under SNMP.

BACKGROUND TO THE INVENTION

Standard SNMP [Simple Network Management Protocol] is defined by the IAB [Internet Architecture Board]. It requires the use of a prescribed database structure—called a Management Information Base, or MIB—to interface with objects. RMON defines certain extensions to the basic SNMP MIB. The three basic specifications relating to SNMP are:

- "Structure and Identification of Management Information for TCP/IP-based "networks" (RFC 1155), defines how managed objects are characterised in the MIB.
- "Management Information Base for Network Management of TCP/IP-based Internets" (MIB-II: RFC 1213) defines the managed objects that can be contained in a MIB.
- "Simple Network Management Protocol" (RFC 1157) defines the protocol used to manage these objects.

[See: "SNMP, SNMPv2, SNMPv3, and RMON 1 and 2" by William Stalling, Addison Wesley, $3^{rd}$ Edition, 1999]

A TCP/IP network managed using SNMP employs at least one management station [NMS] that maintains a database of information extracted from the MIBs of all managed objects within the network. Information collection or extraction is mediated by network management agents (implemented in software) at key platforms, hosts, bridges, hubs, routers, which are able to interrogate object MIBs and to receive unsolicited information therefrom. It is, of course, necessary for every management station, agent and object in this system to support the common IP protocol and, preferably, to have a standard IP address.

Because of the substantial cost involved, IP is not implemented on many simple devices that are part of a larger system that is connected to a TCP/IP network. These devices are therefore not network objects capable of being managed by the NMS using SNMP; they do not have IP addresses and are essentially invisible to the NMS. Often, such devices are inter-connected by a proprietary monitoring or controlling network that does not use TCP/IP protocols, the private network and its devices often being referred to as 'legacy' systems and devices. In other cases, the lack of an IP interface for a 'legacy' device is a consequence of the age of the device; that is, it probably was installed and commissioned before SNMP became ubiquitous. While it is possible to provide a SNMP interface for a legacy device, it would effectively involve the provision of a dedicated computer for each device in order to set-up TCP/IP, establish an IP address and a MIB for that device and to monitor the state of the device.

Moreover, for commercial reasons rather than cost considerations, IP is not implemented on many modern proprietary devices. For example, proprietary multiplexers, demultiplexers, transmitters and receivers employed in telecommunications links, and perhaps containing many thousands of individual devices, are often not implemented as standard network objects. The manufacturers of such complex systems often prefer to connect them via proxy agents to TCP/IP networks running SNMP, the proxy agent software and associated MIBs being proprietary and, often, non-standard. These proxy agents are connected to the devices of the system using proprietary protocols, not IP. Thus such devices are not themselves network objects. In some cases, the proxy agent acts primarily as a protocol converter. For example, Siemens manages devices in some of its SDH [Synchronous Digital Hierarchy] systems using a Q3 protocol in conjunction with its proprietary EMOS device manager, and the University College London has written a protocol converter to interface Q3 with SNMP that can be implemented as the core of a TCP/IP proxy agent. Other examples are CORBA and CMIP that will be known to those skilled in the art.

A major drawback of the proxy agent approach is that that the MIB of the proxy agent tends to be very complex (since it must cover all devices in the proprietary system) and it cannot be readily scaled or modified to take account of the addition, removal or change of devices. This results in inflexibility and, often, the failure of the MIB to accurately reflect the status of the devices or system being monitored via SNMP. The proxy agent, of course, necessarily has a single IP address (corresponding to its single MIB).

In yet other cases, where the network elements to be integrated under a common NMS are private sub-networks each using its own set of IP addresses, integration is impossible because pre-assigned IP addresses in the private IP have already been assigned by the NMS to existing elements of the main network. In other words, connection of such a private network would result in ambiguity and confusion caused by the conflicting or overlapping addresses or address fields. This may require complete reconfiguration of the private network or the reassignment of addresses therein. Such reconfiguration can be expensive and cause considerable inconvenience to existing users of the private network concerned.

OUTLINE OF INVENTION

According to the present invention, one or more of the aforementioned problems can be resolved by the use of a remote system controller (RSC), which is assigned a block of IP addresses, has or is capable of generating a MIB for each address, and is able to use those 'masquerading' addresses to interface with legacy devices, private network elements and non-IP devices. The MIB associated with an assigned address can be populated with data about the associated device, including details of protocols used by that device and the MIB may be physically interfaced with the device by a suitable device driver.

Where the connected devices are elements of a private IP network that have already been assigned an IP addresses within that (sub-)network, the RSC can allocate new host-network addresses from within its block of assigned addresses to these devices, the offset or translation between the original IP address of a device and the new IP address assigned to that device by the RSC being effected by the MIB associated with each device or, more preferably, by a single MIB associated with the sub-network. Thus, the RSC acts to masquerade its address field for the address field originally assigned to the private network. This allows members of the private network to retain and continue to use their original IP addresses while communicating normally with the larger host network without danger of conflict with the same addresses assigned to others in the host network.

Normally, the RSC will use SNMP to monitor and control the devices connected thereto. It will therefore comprise a microprocessor unit adapted to run IP and to be connected to the host network, the microprocessor unit being configured to represent or masquerade a contiguous block of IP addresses to a SNMP network management station [NMS] or appropriate local SNMP agent, the number of IP addresses in the block being at least equal to the number of devices to be connected to the RSC. The RSC may include memory means connected to and accessible by the microprocessor unit, the memory means being configured to comprise a standard SNMP MIB corresponding to each IP address in the block of assigned IP addresses. The RSC may also include a plurality of I/O ports adapted for connecting a plurality of the devices to be monitored and/or controlled by the NMS or agent to the microprocessor unit so that each device has a respectively corresponding one of the RSC MIBs, the corresponding RSC MIB being adapted to be populated with data from or concerning the respective device.

Preferably, the RSC will include a port driver for each I/O port that is adapted to effect protocol translation required to communicate with one or more non IP legacy or proprietary device connected to that port. The RSC will normally have its own IP address that will normally be the first address in the block assigned to the RSC. A routing table within the NMS or agent will indicate that any packets for an address within the block is to be sent to the RSC.

While a one-to-one correspondence between the number of ports and the number of devices is not essential, it is important that every non-IP device connected to the RSC has its dedicated and corresponding MIB for storing data concerning that device. It is thus envisaged that, where more than one device is connected to a port, the protocol translation function will ensure that each of those devices can be effectively addressed via the corresponding MIB. However, as already indicated, a single MIB can be conveniently used for a sub-network of IP devices to effect the address translation between the devices of the sub-network and the block of addresses assigned to the RSC.

Upon receipt of a command packet from a NMS having a given IP address within the block of addresses assigned to the RSC, the RSC reads the address and extracts the data, request or command from the packet and, at the SNMP level, consults the MIB corresponding to the assigned address. If the packet contains data for updating that MIB, this is effected by a SNMP process. If the packet contains a request for information—for example, a record of recent alarms—pertaining to a device, the corresponding MIB is interrogated and the appropriate alarm log extracted and returned by the RSC. If the packet contains a command to effect the control or the direct interrogation of a device, the MIB may be consulted to ensure that the appropriate protocol translation takes place, and the resultant translated command is delivered via the appropriate I/O port to the corresponding device. Data returned from the device is re-translated before being inserted into a responding TCP/IP packet by the RSC.

If the packet contains data for transmission to an IP device on a (former) private network that has now been associated with a given assigned (masquerade) address, the MIB corresponding to the masquerade address is consulted, the (former) private network address determined and that address is substituted in the packet, which is then placed on the private network. Similarly, unsolicited data transmitted from an IP device on the former private network to an external address is intercepted by the RSC, which consults the appropriate MIB to determine the sender's masquerade address, inserts the masquerade sender's address into the packet and places the packet on the external network (usually the Internet).

It will be appreciated that the devices connected to such an RSC—whether IP devices or not—will appear to the SNMP-based NMS or agent as normal IP objects with masquerading addresses, which function in all respects as IP addresses/objects capable of being addressed, interrogated and managed in the normal manner in an SNMP system.

Thus, the present invention not only concerns RSCs with one or more of the components and functions indicated, but it also concerns methods of address masquerading in an IP network to accommodate non-IP devices, legacy devices and IP devices with conflicting IP addresses, and it concerns networks incorporating RSCs or such methods.

DESCRIPTION OF EXAMPLES

Having broadly portrayed the nature of the present invention, examples of the implementation of the invention will now be described by way of illustration only. The examples will be described with reference to the accompanying drawings in which.

Figure 1:
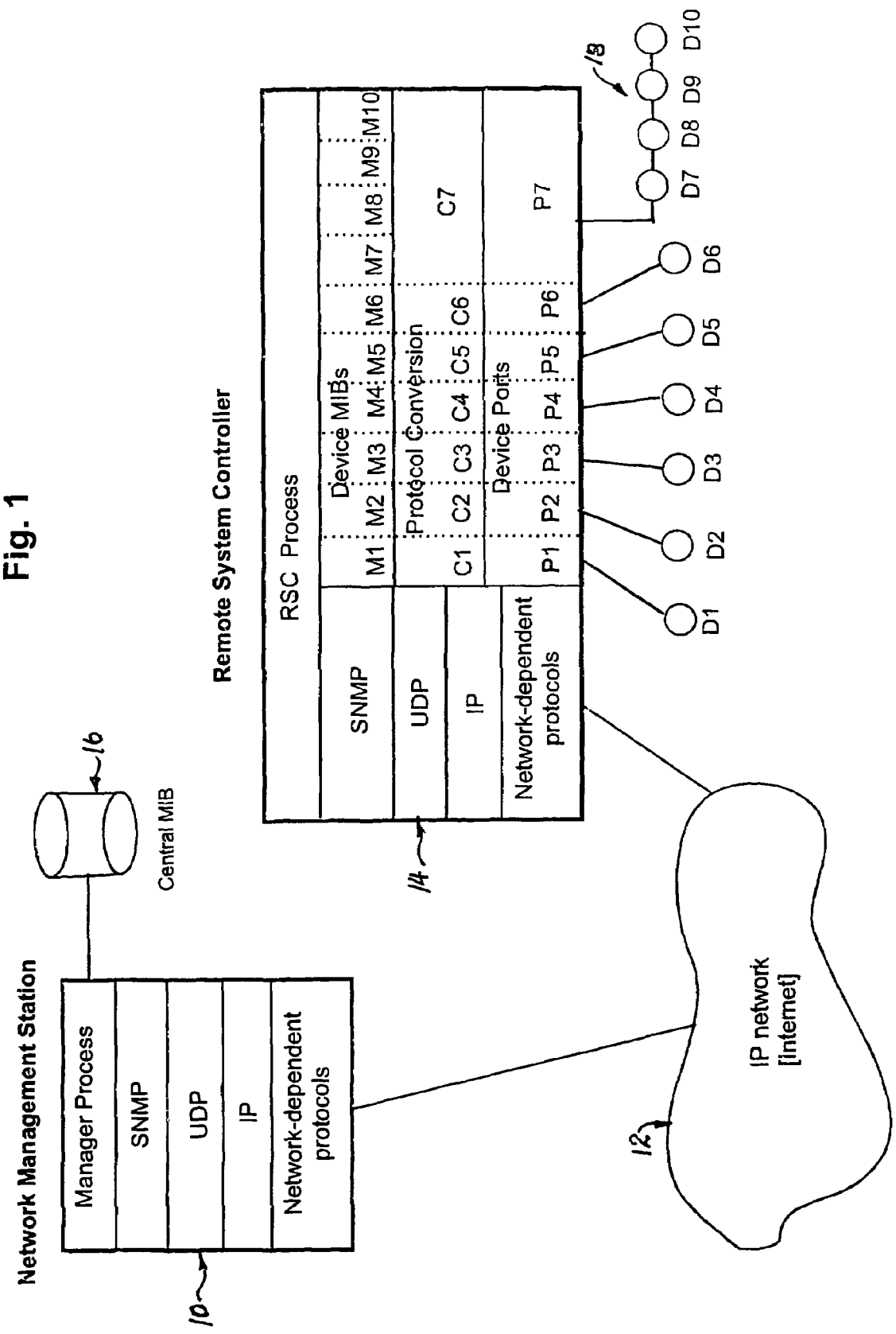
FIG. 1 is a diagram of an IP network including a network management station [NMS], a remote site controller [RSC] and a number of non-IP devices [D1-D10].

Referring to FIG. 1, an NMS (network management station) 10 is connected via a network 12 (normally the Internet) to an RSC 14 formed in accordance with the present invention. Of course, the NMS will have much broader functions than simply communicating with RSC 14, as it will have many SNMP proxies or agents connected to it as well, though these are not shown. NMS 10 has a large dedicated central MIB 16 associated with it that includes data about all network elements and objects and their interconnections. The function and structure of the NMS 10 will not be further elaborated because it is well described in the Stallings text referenced above.

In this example, RSC 14 is assumed to have a block of eleven IP addresses 192.168.100-110 assigned to it, the first of these addresses (192.168.100) being that of the RSC itself. IP addresses 192.168.101-110 are assigned to ten devices D1-D10 that can be connected to and managed by the RSC. Of course, blocks of hundreds or thousands of IP addresses can be assigned to RSCs that are configured to interface with up to the same number of devices.

In this case, RSC 14 has ten MIBs M1-M10, which correspond one-to-one with the ten devices D1-D10. However, in this example, devices D1-D10 are served by only seven ports P1-P7 because port P7 is connected to a string of four devices D7-D10. Each port is supported by its own protocol converter or adaptor, indicated at C1-C7 in FIG. 1. Devices D7-D10 are shown daisy-chained or series-connected but they can be connected to port P7 in any suitable manner—eg, as a star, ring or bus—so long as each of this group of devices can be individually polled or interrogated using protocol converter C7. In other words, this group of devices comprises a sub-network indicated at 18. Network 18 may comprise a legacy network of non-IP devices that is polled or addressed in a manner determined by that network's protocols. However, it could also be an IP network of devices individually addressable under IP, in which case there would probably be no need for separate MIBs M8-M10 or for a separate protocol conversion circuit C7.

Figure 2:
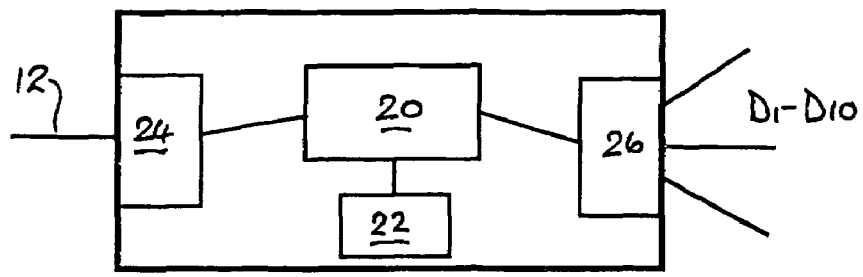
FIG. 2 is simple block diagram indicating the principal hardware components of the RSC of FIG. 1.

Referring to the block diagram of FIG. 2, RSC 14 basically comprises a microprocessor (computer) unit 20 connected to a memory unit 22, which may be implemented as a hard disc or in solid-state and may comprise, read/write and/or read-only sequential access storage and/or random access storage, as is known in the computer art. Microprocessor unit 20 is connected to network 12 by a front-end I/O circuit 24 and, by back-end I/O circuit 26, to devices D1-D10 including network 18 (not shown in FIG. 2). Memory 22 contains the MIBs, the software necessary for the implementation of SNMP on TCP/IP and the software needed for the protocol conversion routines inherent in converters C1-C7.

In one mode of operation, NMS 10 can seek to update its central MIB 16 with data about the condition of device D5 recorded on its MIB M5 and, if so, places a query packet with the IP address 192.168.105 on the network 20, which routes that packet to RSC 14 since NMS 10 knows that device D5 has the network address 192.168.105 and that a block of addresses including this address has been allocated to RSC 14. Upon recognising a packet in the block of addresses assigned to RSC 14, front-end I/O circuit transfers the packet, including the source and destination addresses, to microprocessor unit 20 for disassembly and interpretation. Processor unit 20 then reads the requested data from MIB M5, incorporates it into an answering packet addressed to NMS 10 and places it on network 12 for routing to NMS 10.

In another mode of operation, NMS 10 can directly interrogate the state of a monitored parameter in device D5 by transmitting a suitable interrogation packet addressed, as before, to D5. Upon receipt of this packet, processor 20 initiates the interrogation of device D5 to elicit the desired data. This data may be first recorded in MIB M5 and the copied from M5 into an answering packet, as before. Alternatively, it may be directly incorporated into the answering packet, after suitable protocol conversion via P5.

In yet another mode of operation, an alarm state might occur in, say, device D8 on sub-net 18, which is signalled to MIB M8 via sub-net 18 (and via back-end I/O circuit P7 and protocol conversion circuit C7, if employed). Processor unit 20, which is programmed to monitor MIB M8 because it is known that certain alarm states in device D8 require immediate reporting to NMS 10, detects the alarm state, generates an appropriate reporting packet addressed to NMS 10 and places it on net 12 via front-end I/O circuit 24.

Other modes of operation are possible, depending upon the degree of intelligence and autonomy assigned to RSC 14. With the appropriate degree of capability and authority, RSC 14 could exercise direct control over some of devices D1-D10 without need for instruction from NMS 10. It might, for example, respond to certain alarm conditions by itself.

Figure 3:
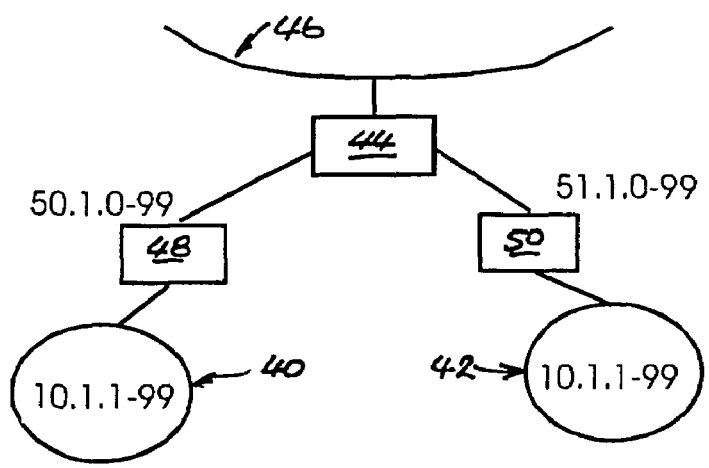
FIG. 3 is a diagram showing the use of RSCs to allow two private IP networks to be effectively integrated into a larger network (such as the Internet) even though some IP addresses are common to both private networks.

Referring now to FIG. 3, the second example assumes that two previously separate private IP networks 40 and 42 are to be interconnected so that devices in one can address devices in the other, and so that devices external to both private networks can communicate with devices in either or both private networks, despite the fact that the same IP addresses have been separately assigned to devices in each of the private networks. For example, an external device could be a router or server 44 connected to the Internet, shown at 46, or the external device could be any other device connected to network 46 (other than those devices included in networks 40 and 42).

According to the present example, each private network 40 and 42 is to be connected to Network 46 via common router 44, each network (40, 41) being interfaced to router 44 via a respective RSC 48, 50, respectively. [Though not shown, each private network could equally well be connected to Network 46 via a separate—rather than a common—server or router.] For convenience, each private network (40, 42) can be regarded as the private network 18 of FIG. 1. The problem that is resolved by the use of RSCs 48 and 50 is that:

(a) networks 40 and 42 happened to have used the same address space (e.g., 10.1.1-99) for their respective groups of devices (though they need not have the same number of devices), and/or their address space conflicts With another already allocated on Network 46; and (b) the cost of reconfiguring either or both of networks 40 and 42 is to be avoided.

The solution to this problem can be simply achieved by using RSC 48 to masquerade the addresses of network 40 to router 44 and RSC 50 to masquerade the addresses of network 42 to router 44. This may be done by assigning new block of 'free' addresses (e.g., 50.1.0-99) to RSC 48 and another new block of addresses (e.g., 51.1.1-99) to RSC 50. The address of RSC 48 itself is 50.1.0 and its MIB is set up to map address space 50.1.1-99 onto the original address space [10.1.1-99] of network 40. Similarly, the address of RSC 50 is set to 51.1.0 and its MIB is programmed to map address space 51.1.1-99 onto the original address space [10.1.1-99] of network 42. Thus, as far as router 44 and the Network 46 are concerned, then, devices in networks 40 and 42 are addressed by the corresponding newly allocated blocks of addresses.

Figure 4:
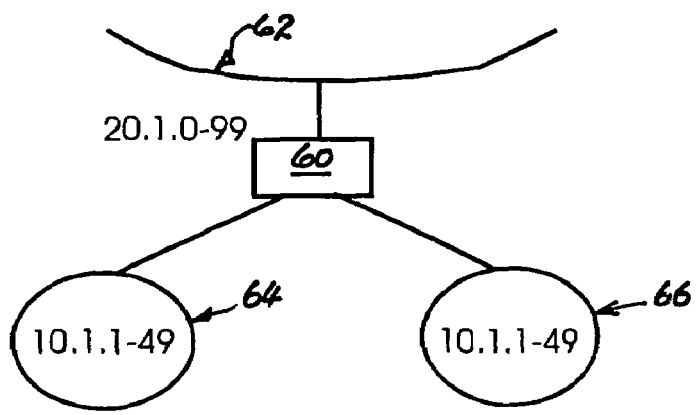
FIG. 4 is a diagram showing the use of one RSC as a pseudo router to allow two private IP networks to be effectively integrated into a larger network (such as the Internet) even though some IP addresses are common to both private networks.

Accordingly, devices in network 40 communicate between each other using their original addresses (10.1.1-99) and devices on network 42 also communicate with each other using the same original addresses (10.1.1-99). However, when a device (e.g., 10.1.36) on network 40 sends a packet to a destination address outside address space 10.1.1-100, it is intercepted by RSC 48 and the sender's masquerade address (e.g., 50.1.36) is substituted for its address on network 40. Similarly, when RSC 48 receives a packet addressed to device 50.1.36, it changes the destination address to the local network address [10.1.36] after consulting the appropriate MIB. Exactly the same happens for network 42: the sender's addresses on outgoing packets are replaced by the corresponding '51.1' masquerade addresses, and the '51.1' masquerade destination addresses of incoming packets are changed to the corresponding local addresses on network 42.

Where the address fields of the conflicting private networks are modest, a RSC can replace a server, as illustrated in FIG. 4. In this case, RSC 60 interfaces a principal network 62 to private network 64 having an address field 10.1.1-49 and also interfaces private network 66 having the same address field to external network 62. Here, RSC 60 is assigned the masquerade address field 20.1.0-99, 20.1.0 being reserved for the RSC itself, the address field 20.1.1-49 is assigned as masquerade addresses for private network 64 (being mapped onto the original address field 10.1.1-49 of network 64) and the address field 10.1.50-98 being assigned as the masquerade addresses for private network 66. The MIBs of RSC 60 are programmed accordingly and RSC 60 can even be set up so that a message from a device in private network 64 for one in private network 66 can be routed directly to the latter network without the need to place the packet on principal network 62.

While the benefits of the invention are evident from the above description of the chosen examples, it will be appreciated that many changes and modifications can be made without departing from the scope of the present invention as defined by the following claims.

The invention claimed is:

1. A remote system controller (RSC) for interfacing an IP network running simple network management protocol (SNMP) to a plurality of network devices, the RSC comprising:
 a microprocessor unit to run IP and to be connected to the network, the microprocessor unit being configured to represent a contiguous block of IP addresses to a network management station (NMS) or appropriate local SNMP agent, the number of IP addresses in said block being at least equal to the number of devices, wherein the microprocessor is further configured to perform a conversion between a private network address and an assigned IP address of the IP addresses of the contiguous block of IP addresses, wherein the private network address corresponds to a device on a private network coupled to the RSC, and wherein the RSC is configured to use the assigned IP address for communications between the device on the private network and another device external to the private network;
 memory means connected to and accessible by the microprocessor unit, the memory means being configured to comprise a standard SNMP MIB corresponding to each IP address in said block of IP addresses; at least one I/O port connected to a plurality of non-IP, legacy or proprietary devices to be monitored and controlled by the RSC; a respective one of said MIBs is associated with each device in said plurality of devices; and said respective MIB is populated with data from or concerning said associated device so as to enable the RSC to communicate with said device via a protocol conversion routine determined by said data in the respective MIB.

2. A RSC according to claim 1 wherein:
 at least one I/O port connected to a plurality of IP devices to be monitored and/or controlled by the RSC;
 each one of said plurality of IP devices has a native IP address that is not an IP address within said block of IP addresses assigned the RSC;
 a respective one of said MIBs is associated with each device in said plurality of devices; and
 said respective MIB is populated with data from or concerning the associated device so as to enable the RSC to communicate with said device via an address translation routine determined by said data in the respective MIB.

3. A RSC according to claim 1 wherein:
 an I/O port connected to a non-IP, legacy or proprietary device;
 one of said MIBs is associated with said non-IP, legacy or proprietary device; and
 said one MIB is populated with data from or concerning the associated device wherein the RSC can communicate with said device via a protocol conversion routine determined by said data in the respective MIB.

4. A RSC according to claim 1 wherein:
 the RSC has an IP address and is itself addressable via that address; and
 the IP address of the RSC is the first or base address in the aforesaid block of addresses assigned to the RSC for devices serviced thereby.

5. A RSC according to claim 1 wherein:
 the RSC includes a software routine for interrogating or determining the status of a device connected thereto and for recording the status of that device in the MIB associated with that device;
 wherein, upon occasions determined by said routine, or upon request by an NMS or agent requesting data concerning that device, the RSC will read the requested data from the MIB associated with that device and automatically return that data to the NMS or agent together with the IP address of that device assigned by the RSC thereto.

6. A RSC according to claim 1 wherein:
 the RSC includes a software routine for varying a controlled parameter of a device connected thereto by utilizing address translation and protocol conversion data stored in an MIB associated with said device;
 wherein, upon occasions determined by said routine, or upon request by an NMS or agent directing adjustment of said parameter of said device, the RSC will activate said routine to effect a required variation or adjustment of said parameter.

7. A method of interfacing a plurality of non-IP devices to an IP network, the method comprising:
 connecting the non-IP devices to separate output ports on a remote system controller (RSC);
 associating a management information base (MIB) with each non-IP device and recording particulars concerning said non-IP device within the MIB;
 associating a protocol conversion circuit with each non-IP device to enable communication with the non-IP device by the RSC;
 assigning a block of IP addresses to the RSC;
 assigning individual IP addresses from said block of IP addresses to individual non-IP devices, wherein said non-IP devices can be individually addressed and interrogated using the IP addresses assigned thereto;
 converting between a private network address and an IP address assigned to a device on the private network, wherein the private network address corresponds to the device on the private network, wherein the private network is coupled to the RSC; and
 using the assigned IP address for communications between the device on the private network and another device external to the private network.

8. A method of interfacing a first network of IP devices to a second network of IP devices where there is duplication or conflict in the IP addresses between the first and second networks, the method comprising:
 connecting the first and second networks to separate output ports on a remote system controller (RSC);
 associating a first management information base (MIB) within the RSC with the first network and recording the IP addresses of the IP devices in the first network within the first MIB;
 associating a second MIB within the RSC with the second network and recording the IP addresses of the IP devices in the second network within the second MIB;
 assigning first and second blocks of IP addresses to the RSC, which are different from the IP addresses employed within the first and second networks;

associating individual IP addresses from said first and second blocks of IP addresses to individual IP devices, wherein said IP devices can be individually addressed and interrogated using the IP addresses assigned thereto;

converting between a private network address and an IP address associated with an individual device on the private network, wherein the private network address corresponds to the individual device on the private network, wherein the private network is coupled to the RSC; and using the associated IP address for communications between the individual device on the private network and another device external to the private network.

9. A network system comprising:

a computer communications network running under TCP/IP and SNMP;

a plurality of non-IP devices for connection to the network;

an interface unit comprising a remote system controller (RSC) having a connection to the network, running TCP/IP and SNMP and having a plurality of IP addresses assigned thereto, wherein the RSC comprises:
 I/O ports for the non-IP devices;
 protocol conversion means associated with each of said I/O ports to communicate with the respective non-IP device;
 a management information base (MIB) associated with each protocol converter or I/O port for storing information about the respective non-IP device, each MIB also being associated with one of the assigned IP addresses wherein the associated non-IP device appears to the network as an IP device at that address and wherein IP commands received by an MIB for the respective non-IP device are converted into signals intelligible by said non-IP device, and wherein signals generated by said non-IP device and transmitted to the RSC are converted into IP signals identified with the IP address of that non-IP device and recorded in the associated MIB or placed on the IP network; wherein the RSC is further configured to use the IP address assigned to an associated device on a private network for communications between the associated device on the private network and another device external to the private network.

10. A network system according to claim 9, wherein the RSC is further configured to use a private network address associated with the associated device on the private network for communications within the private network, wherein the private network address of the associated device on the private network is different from the IP address of the associated device on the private network.

* * * * *

UNITED STATES PATENT AND TRADEMARK OFFICE
CERTIFICATE OF CORRECTION

PATENT NO. : 7,594,005 B2
APPLICATION NO. : 10/362493
DATED : September 22, 2009
INVENTOR(S) : Martin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1697 days.

Signed and Sealed this

Twenty-eighth Day of September, 2010

David J. Kappos
*Director of the United States Patent and Trademark Office*